C. SCHÜRMANN.
CRANKING DEVICE FOR INTERNAL COMBUSTION ENGINES.
APPLICATION FILED JUNE 3, 1920.

1,437,365.

Patented Nov. 28, 1922.

Inventor:
Carl Schürmann

Patented Nov. 28, 1922.

1,437,365

UNITED STATES PATENT OFFICE.

CARL SCHÜRMANN, OF DUSSELDORF, GERMANY.

CRANKING DEVICE FOR INTERNAL-COMBUSTION ENGINES.

Application filed June 3, 1920. Serial No. 386,389.

*To all whom it may concern:*

Be it known that I, CARL SCHÜRMANN, a citizen of the German Republic, and residing at Dusseldorf, in the German Republic, have invented certain new and useful Improvements in Cranking Devices for Internal-Combustion Engines, of which the following is a specification.

In cranking combustion engines it will frequently happen, that ignition occurs before the engine piston has reached the dead center. The engine will then suddenly turn in the opposite direction, and by the backlash of the crank the operator may be seriously injured. It is the object of the present invention to obviate this dangerous backlash of the crank.

Figure 1:
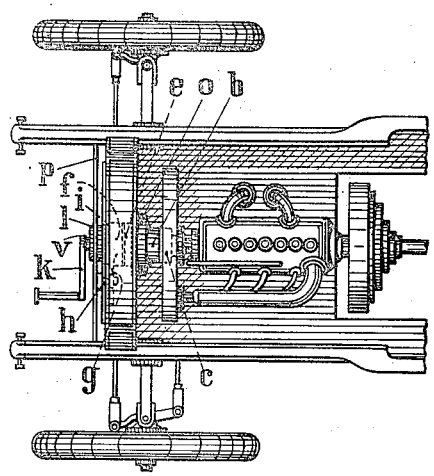
Figure 3:
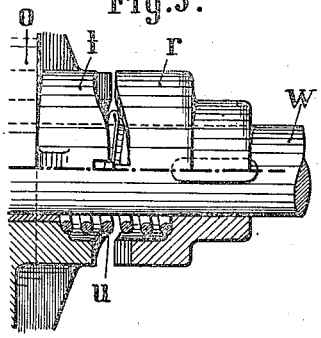
Figure 4:
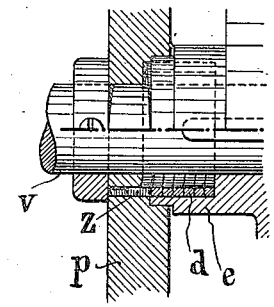
Figure 2:
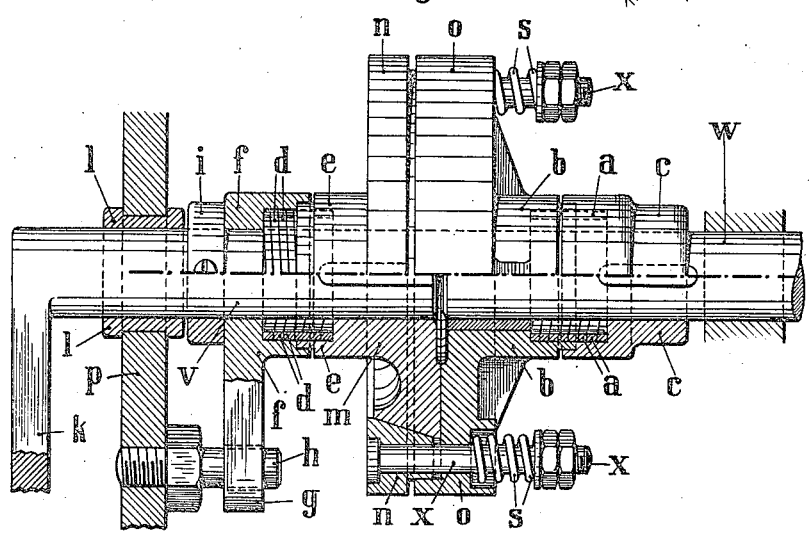

Fig. 1 shows an arrangement embodying my invention fitted to a motor car; Fig. 2 is a form of the invention shown partly in section, partly in elevation. Figs. 3 and 4 are sectional views of parts of the invention in another modification.

To the motor shaft $w$ is keyed a sleeve $c$, in which a coiled spring $a$ fits snugly with a portion of its length, the other portion of the spring $a$ fitting snugly into a bore in the boss $b$. This boss $b$ is rigid with the one half $c$ of a clutch, as by being integral therewith the boss $b$ being disposed to run loose on the motor shaft $w$ save when connected thereto by the spring $a$ and sleeve $c$. Through the clutch member $o$ are passed screw bolts $x$ with springs $s$, which tend to pull the clutch member $n$ towards the member $m$, which is keyed to the cranking shaft $v$; which is in alinement with the motor shaft $w$. The boss $e$ of clutch member $m$ has a bore in which the one portion of a coiled spring $d$ fits snugly, whilst the other portion of said spring is fitted snugly into a stationary sleeve $f$ loose on the cranking shaft $v$. To this sleeve $f$ is fitted an arm $g$, through which is passed a bolt $h$, which is secured to the wall $p$ to hold such sleeve $f$ stationary. In this stationary wall $p$ is also disposed the bearing $l$ for the cranking shaft $v$, on which a collar is provided to hold the sleeve $f$ against endwise movement on such cranking shaft.

When the crank $k$ is turned to the right, for cranking up, the cranking shaft $v$ is revolved together with the clutch member $m$ keyed thereto and transmits its rotation by the friction clutch $m$, $n$, $o$ and the clutch $a$, $b$, $c$ to the motor shaft $w$, whereby the motor is cranked up. The sleeve $e$ moves over the spring $d$, as the latter is wound right handed and will therefore, when the sleeve $e$ is turned to the right, be contracted so far that the sleeve $e$ can move over it. The likewise right-handed spring $e$, on the contrary, will, on the sleeve $b$ being turned to the right, spread and press against sleeve $e$, so that the latter is coupled to sleeve $b$.

The friction clutch $m$, $n$, $o$, which may be of any suitable design, must act so that it can transmit only the force necessary for cranking up the engine in a reliable manner. With the clutch shown in the exemplification the regulation of the torque which may be transmitted is effected by the screws $x$.

When the engine is running, and thus the shaft $w$ leads ahead of the boss $b$, the spring $a$ will, by the friction in the sleeves $b$ and $c$ be coiled up slightly, so that the said sleeves are immediately again disengaged from each other and the motor shaft $w$ can revolve freely in the boss $b$ of the clutch $m$, $n$, $o$, which will now stand still.

In case the motor should lash back when being cranked, shaft $w$ will turn the friction clutch members $o$ and $n$ to the left; but the friction clutch will permit yielding, by the sliding of the ring $n$ over the member $m$, because the latter is held against backward rotation by the action of the spring $d$, which upon such backward rotation is expanded sufficiently to lock the sleeves $e$ and $f$ together and in consequence to hold the sleeve $e$ with the friction-clutch member $n$ from turning backward. In other words, when the sleeve $e$ revolves to the left, the spring $d$ will unwind a little, and will in consequence thereof bear tightly against the sleeves $e$ and $f$, so that these are coupled together and the sleeve $e$ is held by arm $g$. The backlash of the motor will therefore not be transmitted to the crank $k$.

For saving space in an axial direction the spring $d$, instead of being disposed in a separate sleeve $f$, may be arranged as shown in Fig. 4, where its forward end is directly associated with the wall $p$, as by being mounted in a boss-like projection thereof.

Both ends of each coil spring may be loosely received in recesses so that both ends of the springs may turn in their respective recesses; or one end of the coil spring may be rigidly attached to one of its associated members, as by having a bent end $z$ which is received in an eccentrically located hole in such associated member, as the forward end of the spring $d$ is illustrated in Fig. 4.

The driving connection from the clutch member $o$ to the motor shaft may also be arranged in the manner shown in Fig. 3. This is a toothed clutch of the known type, the one member $r$ of which is secured to shaft $w$, whilst the other member $t$ is coupled to the friction clutch $o$. Between the two clutch member is disposed a spring $u$, which tends to move the gear away from part $r$, as the crank shaft and the parts fitted thereto and the friction clutch are, in this case, axially shiftable, and sufficient room is provided between the ends of the two shafts, to allow of the gear coming into engagement. When the engine starts, the gear will loosen by itself. The spring $u$ also prevents the teeth of the clutch from engaging with each other when this is not desired.

The gear $d, e, f$ must work free of all play, as else the crank might lash back in case of pre-ignitions.

I claim:

1. In a cranking mechanism, the combination of an internal combustion engine having a crank shaft with a ratchet part fitted thereon, a second ratchet part and a friction coupling member fitted loose on said crank shaft, a stud shaft disposed adjacent said crank shaft and having a crank handle, a second friction coupling member and a clutch member fitted on said stud shaft, a second clutch member on said stud shaft but prevented from turning thereon, a coiled spring disposed between said two clutch members and coupling two clutch members together when there is a tendency to move the stud shaft backward, so that such backward movement is prevented.

2. In a cranking mechanism for automobiles, the combination of an engine shaft, an alined cranking shaft, a friction clutch having one member fixed to said cranking shaft and the other member frictionally connected to the first member, a connection between the second clutch member and the engine shaft for forming a driving connection between them upon relative movement in one direction only, a stationary member adjacent to the first clutch member, said stationary member and said first clutch member being provided with abutting faces in which there are alined circular recesses, and a single helical spring fitting in said recesses to lock said first clutch member and said stationary member together by unwinding and expanding upon a tendency for the cranking shaft and first clutch member to move backward but to unlock them by winding up and contracting when said cranking shaft and first clutch member are turned forward.

3. In a cranking mechanism for automobiles, the combination of an engine shaft, an alined cranking shaft, a friction clutch having one member fixed to said cranking shaft and the other member frictionally connected to the first member, a sleeve fixed on said engine shaft, said second clutch member and said sleeve having axially abutting faces with alined circular recesses in them, and a single helical spring fitting in the recesses in said second clutch member and sleeve to lock them together by the uncoiling and expansion of said helical spring when the second clutch member is moved forward relatively to the engine shaft and to unlock them by the coiling up of said spring when the engine shaft is moved forward with respect to said second clutch member, a stationary member adjacent to the first clutch member, said stationary member and said first clutch member being provided with abutting faces in which there are alined circular recesses, and a single helical spring fitting in said recesses to lock said first clutch member and said stationary member together by unwinding and expanding upon a tendency for the cranking shaft and first clutch member to move backward but to unlock them by winding up and contracting when said cranking shaft and first clutch member are turned forward.

4. In a cranking mechanism for automobiles, the combination of an engine shaft, an alined cranking shaft, a friction clutch having one member fixed to said cranking shaft and the other member frictionally connected to the first member, a sleeve fixed on said engine shaft, said second clutch member and said sleeve having axially abutting faces with alined circular recesses in them, and a single helical spring fitting in the recesses in said second clutch member and sleeve to lock them together by the uncoiling and expansion of said helical spring when the second clutch member is moved forward relatively to the engine shaft and to unlock them by the coiling up of said spring when the engine shaft is moved forward with respect to said second clutch member, a stationary member adjacent to the first clutch member, and means acting between said first clutch member and said stationary member to permit rotation of said first clutch member in the direction of engine rotation but to prevent rotation of said first clutch member in the opposite direction.

5. In a cranking device for automobiles, the combination of an engine shaft, an alined cranking shaft, a friction clutch having one member fixed to said cranking shaft and the other member frictionally connected to the first member, a connection between the second clutch member and the engine shaft for forming a driving connection between them independently of any relative axial movement when the cranking shaft is turned in the direction of engine rotation or the engine shaft is turned in the opposite direction but to permit the engine shaft to turn in the direction of engine rotation free from said second clutch member, a stationary member adjacent to the first clutch member, and means acting between said stationary member on the one hand and said cranking shaft and said first clutch member on the other hand for permitting said cranking shaft and first clutch member to turn relatively to said stationary member in the direction of engine rotation but to prevent them from turning in the opposite direction.

6. In a cranking mechanism for automobiles, the combination of an engine shaft, an alined cranking shaft, a friction clutch having one member fixed to said cranking shaft and the other member frictionally connected to the first member, a connection between the second clutch member and the engine shaft for forming a driving connection between them upon relative movement in one direction only, a stationary member adjacent to the first clutch member, one of said two last-named members (the stationary member and the first clutch member) being provided with a circular recess in its end face, and a single helical spring having a driving connection with the other of said two members and fitting in said recess to lock said two members together when they are moved relatively in the direction to unwind said spring and to unlock them when they are moved relatively in the other direction.

7. In a cranking mechanism for automobiles, the combination of an engine shaft, an alined cranking shaft, a friction clutch having one member fixed to said cranking shaft and the other member frictionally connected to the first member, said second clutch member and said engine shaft having parts which are adjacent to each other and in one of which there is a circular recess, and a single helical spring having a driving connection with the other of said two parts and fitting in said recess and locking said two parts together by the uncoiling and expansion of said helical spring when the second clutch member is moved forward relatively to the engine shaft and to unlock them by the coiling up of said spring when the engine shaft is moved forward with respect to said second clutch member, a stationary member adjacent to the first clutch member, one of said two last-named members (the stationary member and the first clutch member) being provided with a circular recess in its end face, and a single helical spring having a driving connection with the other of said two members and fitting in said recess to lock said two members together when they are moved relatively in the direction to unwind said spring and to unlock them when they are moved relatively in the other direction.

8. In a cranking mechanism for automobiles, the combination of an engine shaft, an alined cranking shaft, a friction clutch having one member fixed to said cranking shaft and the other member frictionally connected to the first member, said second clutch member and said engine shaft having parts which are adjacent to each other and in one of which there is a circular recess, and a single helical spring having a driving connection with the other of said two parts and fitting in said recess and locking said two parts together by the uncoiling and expansion of said helical spring when the second clutch member is moved forward relatively to the engine shaft and to unlock them by the coiling up of said spring when the engine shaft is moved forward with respect to said second clutch member, a stationary member, and means acting between said first clutch member and said stationary member to permit rotation of said first clutch member in the direction of engine rotation but to prevent rotation of said first clutch member in the opposite direction.

In testimony whereof I affix my signature.

CARL SCHÜRMANN.